(No Model.)

L. TILLINGHAST.
Manufacture of Goods made of Hard Rubber or Similar Material.

No. 229,847.            Patented July 13, 1880.

Witnesses.
H. W. Hubbard.
S. Schofield

Inventor.
Leonard Tillinghast

UNITED STATES PATENT OFFICE.

LEONARD TILLINGHAST, OF PROVIDENCE, RHODE ISLAND.

MANUFACTURE OF GOODS MADE OF HARD RUBBER OR SIMILAR MATERIAL.

SPECIFICATION forming part of Letters Patent No. 229,847, dated July 13, 1880.

Application filed May 11, 1880. (No model.)

*To all whom it may concern:*

Be it known that I, LEONARD TILLINGHAST, of Providence, in the State of Rhode Island, have invented an Improvement in the Manufacture of Goods made of Hard Rubber or Similar Material, of which the following is a specification.

The nature of my invention consists in the method of producing angular effects in articles made of plates of hard rubber or similar material by first molding or impressing grooves into the plate at the desired angular points of bending and then deflecting the plate at these points under heat, so as to produce the angular effects desired.

Figure 1:
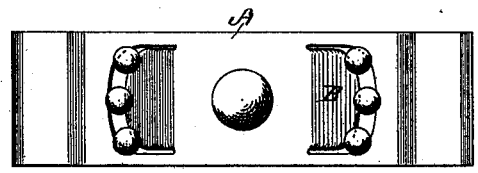
Figure 2:
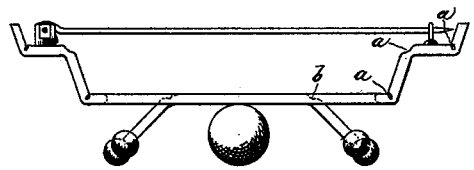
Figure 3:
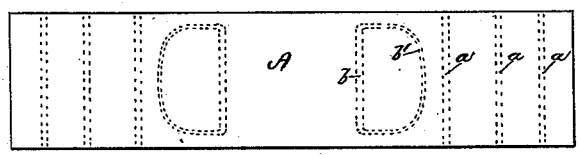
Figure 4:

Figure 1 represents the face view of a braid-pin embodying my improvement. Fig. 2 represents an edge view of the same. Fig. 3 represents a face view of the original plate of hard rubber, showing the grooves impressed therein previous to bending. Fig. 4 is an edge view of the same.

In the accompanying drawings, Figs. 3 and 4, A represents a plate of hard rubber or similar material, having upon one side the indented grooves $a\ a\ a$, extending from one edge of the plate to the other, and the straight groove $b$, the ends of which are joined by the narrower curved groove $b'$. These grooves are formed by means of a suitable die when the rubber is in a plastic condition.

The plate of rubber A is to be cut through, by sawing or otherwise, at the groove $b'$, thus leaving the groove $b$ to form the angular line of the lip B, which is to be deflected at an angle with the face of the plate, as shown in Figs. 1 and 2, the plate being suitably softened by heat, so that the bend may take place at the bottom of the groove without causing the plate to crack at the bending-point. The plate A, at the grooves $a\ a\ a$, may be heated and bent angularly, as shown in Figs. 1 and 2, the front face of the plate presenting a smooth angular surface.

Bracelets, articles of jewelry, backs of combs, and other desirable articles may be made and ornamented in this manner.

I claim as my invention—

The method of forming up articles made of hard rubber or similar material by first molding or impressing bending-grooves at the desired angular points, with subsequent heating and bending to the required angular form, substantially as described.

LEONARD TILLINGHAST.

Witnesses:
HARMON S. BABCOCK,
H. W. HUBBARD.